United States Patent
Tian

(10) Patent No.: US 11,482,874 B2
(45) Date of Patent: Oct. 25, 2022

(54) METHOD FOR CHARGING BATTERY, TERMINAL AND COMPUTER STORAGE MEDIUM

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 258 days.

(21) Appl. No.: 16/632,503

(22) PCT Filed: Oct. 12, 2018

(86) PCT No.: PCT/CN2018/110006
§ 371 (c)(1),
(2) Date: Apr. 16, 2020

(87) PCT Pub. No.: WO2020/073307
PCT Pub. Date: Apr. 16, 2020

(65) Prior Publication Data
US 2021/0226469 A1   Jul. 22, 2021

(51) Int. Cl.
*H02J 7/00* (2006.01)
*H01M 10/42* (2006.01)
*H01M 10/44* (2006.01)

(52) U.S. Cl.
CPC ....... *H02J 7/00714* (2020.01); *H01M 10/425* (2013.01); *H01M 10/44* (2013.01);
(Continued)

(58) Field of Classification Search
CPC .... H02J 7/00714; H02J 7/0036; H02J 7/0047; H01M 10/425; H01M 10/44; H01M 2010/4278
(Continued)

(56) References Cited

U.S. PATENT DOCUMENTS

2006/0284598 A1\* 12/2006 Xiong ................... H02J 7/0013
320/128
2009/0273319 A1\* 11/2009 Young ...................... H02J 7/00
320/137

FOREIGN PATENT DOCUMENTS

CN   102136611 A   7/2011
CN   105186626 A   12/2015
(Continued)

OTHER PUBLICATIONS

Machine translation of KR 101721202, 2 pages (Year: 2017).\*
(Continued)

*Primary Examiner* — Nathaniel R Pelton
(74) *Attorney, Agent, or Firm* — Young Basile Hanlon & MacFarlane, P.C.

(57) ABSTRACT

Embodiments of the present disclosure disclose a charging method, a terminal and a computer storage medium. The charging method includes: detecting a battery power and a power consumption parameter before turning on a fast charging function; determining an estimated charging time according to the battery power and the power consumption parameter; determining whether an abnormal charging occurs according to the estimated charging time after turning on the fast charging function; and turning off the fast charging function when determining that the abnormal charging occurs.

15 Claims, 3 Drawing Sheets

(52) U.S. Cl.
CPC .......... *H02J 7/0036* (2013.01); *H02J 7/0047* (2013.01); *H01M 2010/4278* (2013.01)

(58) Field of Classification Search
USPC ........................................................ 320/137
See application file for complete search history.

(56) References Cited

FOREIGN PATENT DOCUMENTS

| | | | |
|---|---|---|---|
| CN | 106932726 | A | 7/2017 |
| CN | 107508343 | A | 12/2017 |
| CN | 107831386 | A | 3/2018 |
| CN | 108599305 | A | 9/2018 |
| EP | 0709943 | A2 | 5/1996 |
| EP | 3273570 | A1 | 1/2018 |
| JP | 2013153614 | A | 8/2013 |
| KR | 20080053552 | A | 6/2008 |
| KR | 20110134097 | A | 12/2011 |
| KR | 101449291 | B1 | 10/2014 |

OTHER PUBLICATIONS

Indian Examination Report for IN Application 202017007907 dated May 28, 2021. (6 pages).
Korean Office Action with English Translation for KR Application 10-2020-7006391 dated Jun. 10, 2021. (10 pages).
Japan Office Action with English Translation for JP Application 2020-512851 dated Mar. 2, 2021. (10 pages).
European Search Report for EP Application 18936296.5 dated Feb. 1, 2021. (14 pages).
English Translation of International Search Report for PCT application PCT/CN2018/110006 dated Jul. 16, 2019.
Korean Notice of Allowance with English Translation for KR Application 1020207006391 dated Dec. 23, 2021. (4 pages).
Summons to attend oral proceedings pursuant to Rule 115(1) EPC for EP Application 18936296.5 dated Jan. 20, 2022. (5 pages).
Chinese Office Action with English Translation for CN Application 201880026998.9 dated Mar. 31, 2022. (16 pages).

* cited by examiner

| correspondence relationship between the battery power, the power consumption parameter and the estimated charging time ||| 
|---|---|---|
| Battery Power | Power Consumption Parameter | Estimated Charging Time |
| 50% | 80 | 50min |
| 50% | 20 | 20min |
| ...... | ...... | ...... |
| 60% | 20 | 17min |
| 75% | 55 | 42min |

METHOD FOR CHARGING BATTERY, TERMINAL AND COMPUTER STORAGE MEDIUM

CROSS-REFERENCE TO RELATED APPLICATION(S)

This application is a 371 application of International Application No. PCT/CN2018/110006, filed on Oct. 12, 2018, the entire disclosure of which is hereby incorporated by reference.

TECHNICAL FIELD

Embodiments of the present disclosure relate to a charging technology in a field of terminals, and more particularly, to a charging method, a terminal and a computer storage medium.

BACKGROUND

With a fast charging technology, a battery in a terminal may be charged in a multi-stage constant current mode through an adapter, so that fast charging may be performed on the premise of ensuring safety and reliability, which greatly improves a charging speed of the terminal. Since the terminal realizes the fast charging by establishing bidirectional communication with the adapter to perform large current charging, serious consequences may be caused once the terminal is abnormal during fast charging, and thus, monitoring of abnormal charging conditions during the fast charging is particularly important.

SUMMARY

Embodiments of the present disclosure provide a charging method. The method includes: detecting a battery power and a power consumption parameter before turning on a fast charging function; determining an estimated charging time according to the battery power and the power consumption parameter; determining whether the abnormal charging occurs according to the estimated charging time after turning on the fast charging function; and turning off the fast charging function when determining that an abnormal charging occurs.

Embodiments of the present disclosure provide a terminal. The terminal includes a processor and a memory storing instructions executable by the processor. When the instructions are executed by a processor, the charging method as described above is implemented.

Embodiments of the present disclosure provide a computer readable storage medium having a program stored thereon and applied to the terminal. When the program is executed by a processor, the charging method as described above is implemented.

DETAILED DESCRIPTION

In the following, technical solutions in embodiments of the present disclosure will be described clearly and completely with reference to accompanying drawings. It should be understood that, specific embodiments described herein are only used to explain the present disclosure rather than to limit the present disclosure. In addition, it should also be noted that, for convenience of description, only parts related to the present disclosure are illustrated in the accompanying drawings.

When fast charging is performed on the terminal, the super-fast charging function needs to be realized through a customized adapter and battery. Generally, a microcontroller unit (MCU) intelligent chip is configured in the adapter for the super-fast charging, so that the adapter is an upgradable intelligent charger.

Figure 1:
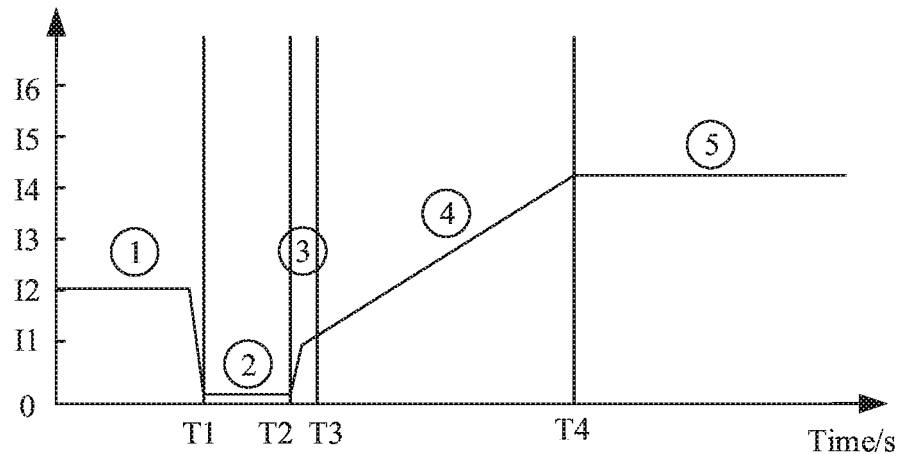
FIG. 1 is a schematic diagram of a fast charging communication process according to an embodiment of the present disclosure.

Further, in an embodiment of the present disclosure, FIG. 1 is a schematic diagram of a fast charging communication process according to an embodiment of the present disclosure. As illustrated in FIG. 1, the process of performing fast charging on the terminal by the adapter mainly includes the following five stages.

Stage 1: the terminal detects a type of the adapter. The adapter starts handshake communication between the adapter and the terminal, and sends an instruction to inquire whether the terminal agrees to start a fast charging mode. After the terminal agrees to start the fast charging, the fast charging communication process enters Stage 2.

The terminal may detect the type of the adapter through D+ and D− wires. When the adapter is detected to be a charging device which does not perform the charging via a universal serial bus (USB), the current absorbed by the terminal may be greater than a preset current value 12. When the adapter detects that an output current of the adapter within a preset time period is greater than or equal to 12, the adapter considers that the terminal has finished identifying the type of the adapter. Then, the adapter starts handshake communication between the adapter and the terminal, and the adapter sends an instruction to inquire whether the terminal agrees to start the fast charging mode. When the adapter receives a reply instruction from the terminal indicating that the terminal does not agree to start the fast charging mode, the output current of the adapter is detected again. When the output current of the adapter is still greater than or equal to 12, the request is initiated again to inquire whether the terminal agrees to start the fast charging mode, and steps in Stage 1 are repeated until the terminal agrees to start the fast charging mode in reply, or until the output current of the adapter is no longer greater than or equal to 12.

Stage 2: the adapter sends another instruction to the terminal to inquire whether the output voltage of the adapter is suitable. After the terminal replies to the adapter that the output voltage is high, low or suitable, the adapter adjusts the output voltage until the output voltage is suitable.

The voltage output by the adapter may include several levels. The adapter may send an instruction to the terminal to inquire whether the output voltage of the adapter is suitable for being used as the charging voltage in the fast charging mode or not. When the adapter receives feedback from terminal that the output voltage of the adapter is high or low, the adapter adjusts the output voltage of the adapter by one level, and sends an instruction to the terminal again to inquire the terminal whether the output voltage of the adapter of is suitable or not.

Stage 3: the adapter sends a further instruction to the terminal to inquiring a maximum charging current presently supported by the terminal, and the terminal replies to the adapter the maximum charging current, and then the process enters Stage 4.

Stage 4: the adapter may set the output current to the maximum charging current currently supported by the terminal, and enters a constant current stage, i.e. Stage 5.

Stage 5: when entering the constant current stage, the adapter may send another instruction at intervals to inquire about the present voltage of a battery in the terminal. The terminal may feed back the present voltage of the battery in the terminal to the adapter. The adapter may determine whether contact is good and whether the present charging current value of the terminal needs to be lowered according to the feedback of the terminal about the present voltage of the battery in the terminal.

It should be noted that the constant current stage does not mean that the output current of the adapter is kept constant in Stage 5. The constant current refers to a multi-stage constant current, that is, the current is kept constant for a period of time.

Since the fast charging is realized by establishing bidirectional communication between the adapter and the terminal to perform the multi-stage constant current charging on the terminal, in order to ensure the safety and the reliability of the fast charging, it is particularly important to monitor abnormal charging conditions when the fast charging is performed on the terminal.

The technical solutions in embodiments of the present disclosure will be clearly and completely described below with reference to the drawings in embodiments of the present disclosure.

Figure 2:
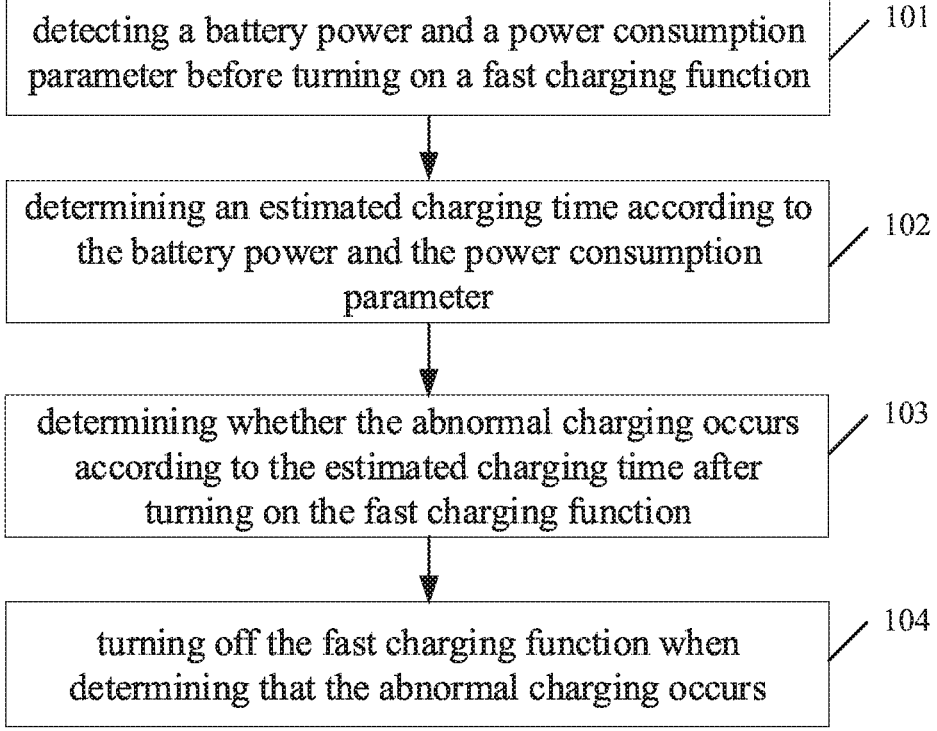
FIG. 2 is a schematic flow chart of an implementation of a charging method according to an embodiment of the present disclosure.

An embodiment of the present disclosure provides a charging method. FIG. 2 is a schematic flow chart of an implementation of a charging method according to an embodiment of the present disclosure. As illustrated in FIG. 2, in an embodiment of the present disclosure, the method for charging the terminal may include the followings.

At block 101, a battery power and a power consumption parameter are detected before a fast charging function is turned on.

In an embodiment of the present disclosure, after establishing connection with the adapter, the terminal may first detect the battery power and the power consumption parameter before turning on the fast charging function.

Further, in an embodiment of the present disclosure, the terminal is a device to be charged that may be connected to the adapter. The terminal may be any terminal having communication and storage functions, for example, a tablet computer, a mobile phone, an electronic reader, a remote controller, a personal computer (PC), a notebook computer, a vehicle-mounted device, a network television, a wearable device, or the like.

Further, in an implementation of the present disclosure, the terminal may receive a request instruction first before detecting the battery power and the power consumption parameter. The request instruction is configured for request and query to establish the connection and turn on the fast charging function.

It should be noted that, in embodiments of the present disclosure, the terminal may perform the fast charging function through connection and communication with the adapter.

It should be noted that in embodiments of the present disclosure, after the terminal establishes the connection with the adapter, the adapter may send a clock signal to the terminal through a data wire in an USB interface. The clock signal is configured to indicate a communication sequence between the adapter and the terminal. In detail, the adapter actively transmits the clock signal to the terminal, and the adapter may maintain the transmission of the clock signal throughout the connection with the terminal, so that bidirectional communication with the terminal may be performed under the control of the communication sequence.

Further, in embodiments of the present disclosure, the communication sequence includes an instruction transmission period of the adapter and an instruction reception period of the adapter, which are alternately generated.

Further, in an embodiment of the present disclosure, the adapter may be configured to perform fast charging on the terminal. In detail, the adapter and the terminal may be connected through the universal serial bus (USB) interface. The USB interface may be a common USB interface, a micro USB interface or a Type-C interface. The power wire in the USB interface is configured for the adapter to charge the terminal. The power wire in the USB interface may be a VBus wire and/or a ground wire in the USB interface. The data wire in the USB interface is configured for bidirectional communication between the adapter and the terminal. The data wire may be the D+ wire and/or the D− wire in the USB interface. The bidirectional communication may refer to an information interaction between the adapter and the terminal.

Further, in the embodiment of the present disclosure, the adapter may support a normal charging mode and a fast charging mode. A charging current in the fast charging mode is greater than a charging current in the normal charging mode, that is, a charging speed of the fast charging mode is greater than a charging speed of the normal charging mode. In general, the normal charging mode may be understood as a charging mode with a rated output voltage of 5V and a rated output current of 2.5 A or less. In addition, in the normal charging mode, output ports D+ and D− of the power adapter may be short-circuited, while in the fast charging mode, the power adapter may communicate and exchange data with a mobile terminal by using the output ports D+ and D−.

Further, in embodiments of the present disclosure, the terminal may first detect the battery power and the power consumption parameter of the terminal after establishing connection with the adapter and before turning on the fast charging function.

It should be noted that, in embodiments of the present disclosure, the terminal detects an electric quantity of the battery to obtain the battery power, so that the charging time may be estimated according to the battery power. The higher the battery power is, the shorter the required charging time is; and accordingly, the lower the battery power is, the longer the required charging time is.

Further, in embodiments of the present disclosure, the terminal may further detect the power consumption parameter, in which the power consumption parameter may represent a present power consumption condition of the terminal.

Further, in embodiments of the present disclosure, when the terminal acquires the power consumption parameter, the terminal may first detect a running application corresponding to the terminal and an running state. The terminal may detect a present running state, in which the present running state may include a standby state, a call state, a multimedia state and the like. Meanwhile, the terminal may further detect an application that is already opened or running, that is, a present running application. The present running application may include an application such as a video player, WeChat, or a photographing application.

Further, in an embodiment of the present disclosure, after the terminal detects and obtains the present running state and the present running application, the terminal may further determine the power consumption parameter according to the present running state and the present running application.

It should be noted that in an embodiment of the present disclosure, before the terminal establishes the bidirectional communication with the adapter and performs the fast charging, the terminal may determine the electric quantity condition and the power consumption condition of itself first, that is, may detect the battery power and the power consumption parameter first, so that the time required for charging may be further estimated.

At block 102, an estimated charging time is determined according to the battery power and the power consumption parameter.

In embodiments of the present disclosure, after detecting the battery power and the power consumption parameter, the terminal may estimate the required charging time according to the battery power and the power consumption parameter, that is, determine the estimated charging time.

It should be noted that, in embodiments of the present disclosure, the terminal may estimate and calculate the required charging time according to the battery power, the running state and the running application, that is, the terminal may calculate the estimated charging time according to the battery power and the power consumption parameter.

Further, in embodiments of the present disclosure, when the fast charging is performed on the terminal through the adapter, the estimated charging time may be different for different battery power. In detail, the higher the battery power is, the shorter the estimated charging time is.

Further, in embodiments of the present disclosure, when the fast charging is performed on the terminal through the adapter, different power consumption parameters correspond to different estimated charging time. In detail, the higher the power consumption parameter is, the longer the estimated charging time is.

Figures 3, 4:
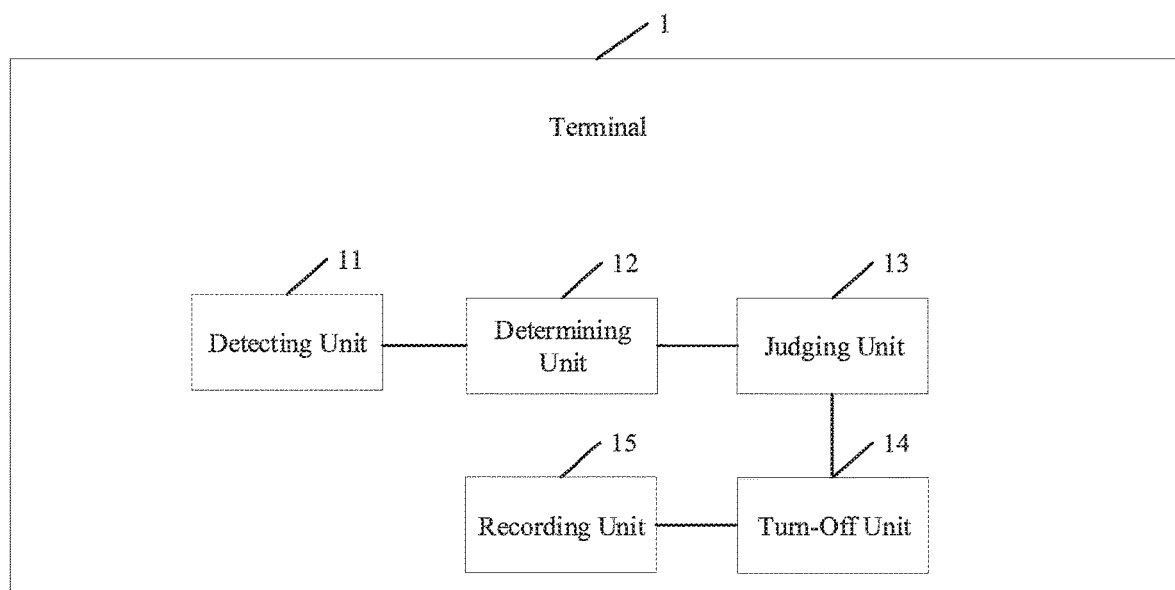
FIG. 3 is a schematic diagram of a battery power, a power consumption parameter and an estimated charging time.
FIG. 4 is a schematic diagram of a terminal according to an embodiment of the present disclosure.

FIG. 3 is a schematic diagram of a battery power, a power consumption parameter and an estimated charging time. As illustrated in FIG. 3, when the battery power is 50%, the estimated charging time corresponding to the power consumption parameter of 80 is far longer than the estimated charging time corresponding to the power consumption parameter of 20.

Further, in embodiments of the present disclosure, the estimated charging time may be the total charging time required for the terminal to complete the fast charging, or may be the duration of a charging phase when the fast charging is performed on the terminal. For example, the above estimated charging time may be a completion time of the fast charging, or may be a constant current charging time in the fast charging.

It should be noted that, in embodiments of the present disclosure, according to the estimated charging time obtained by the terminal on the basis of the battery power and the power consumption parameter, the terminal may effectively predict the time required for the fast charging to be performed on the terminal, and thus may further determine whether the charging state is normal according to the estimated charging time.

At block 103, whether the abnormal charging occurs is determined according to the estimated charging time after the fast charging function is turned on.

In embodiments of the present disclosure, after determining the estimated charging time according to the battery power and the power consumption parameter, the terminal may judge whether the abnormal charging occurs according to the estimated charging time after the fast charging function is turned on.

Further, in embodiment of the present disclosure, after turning on the fast charging function through the bidirectional communication established with the adapter, the terminal may monitor the fast charging process of the terminal according to the estimated fast charging time, and thus may further determine whether the abnormal charging exists or not.

It should be noted that, in embodiments of the present disclosure, when the fast charging is performed on the terminal, supposing that the recorded charging time exceeds the estimated charging time, the terminal may consider that the abnormal charging occurs. In detail, when the terminal does not complete the fast charging or a certain charging stage within the estimated charging time, the terminal may consider that the fast charging process is abnormal, that is, the abnormal charging exists.

Further, in embodiments of the present disclosure, when determining whether the abnormal charging exists, the terminal needs to compare a real-time charging time with the estimated charging time. Therefore, after the terminal turns on the fast charging function, it is also necessary for the terminal to record the charging time in real time, so that whether the abnormal charging exists may be determined in combination with the estimated charging time.

At block 104, the fast charging function is turned off when determining that the abnormal charging occurs.

In embodiments of the present disclosure, after determining whether the abnormal charging occurs according to the estimated charging time, the terminal may turn off the fast charging function when determining that the abnormal charging occurs.

Further, in embodiments of the present disclosure, after the terminal determines whether the abnormal charging exists according to the estimated charging time, the terminal may activate a preset protection mode for protecting charging safety of the terminal when determining that the abnormal charging exists.

It should be noted that, in embodiments of the present disclosure, the preset protection mode may be configured to process the abnormal charging. In detail, the preset protection mode may refer to turning off the fast charging function and terminating the fast charging. The preset protection mode may further refer to reducing an input power of the fast charging and charging the terminal with a small input power.

According to the charging method provided by embodiments of the present disclosure, the terminal detects the battery power and the power consumption parameter before turning on the fast charging function; determines the estimated charging time according to the battery power and the power consumption parameter; determines whether the abnormal charging occurs according to the estimated charging time after turning on the fast charging function; and turns off the fast charging function when determining that the abnormal charging occurs. Therefore, in embodiments of the present disclosure, the terminal may estimate the estimated charging time required by the fast charging according to the battery power and the power consumption condition of the battery before the fast charging, and may determine whether the abnormal charging condition exists according to the estimated charging time and the actual charging time after the fast charging function is turned on, so that the terminal may monitor the abnormal charging during the fast charging, and may terminate the fast charging in time once the abnormal charging is detected, thereby effectively improving the safety and intelligence of the terminal.

According to the above embodiment, in another embodiment of the present disclosure, before determining whether the abnormal charging occurs according to the estimated charging time, the method for charging the terminal may further include the followings.

At block 105, a charging time is recorded when turning on the fast charging function.

In embodiments of the present disclosure, before determining whether the abnormal charging occurs according to the estimated charging time, the terminal may record the charging time after turning on the fast charging function.

It should be noted that, in embodiments of the present disclosure, after turning on the fast charging function, the terminal may start time recording, to obtain the time of charging performed by the terminal, that is, to obtain the charging time.

It should be noted that, in embodiments of the present disclosure, when determining whether the abnormal charging exists, the terminal needs to combine an actual time of the fast charging performed by the terminal with the estimated charging time, and thus, the terminal may record the charging time when performing the fast charging.

Further, in embodiments of the present disclosure, the method for the terminal to determine whether the abnormal charging occurs according to the estimated charging time may include the following steps.

In step 201, a present charging state is detected if the charging time is greater than or equal to the estimated charging time.

In embodiments of the present disclosure, after turning on the fast charging function and recording the charging time, the terminal may detect the charging state, that is, the terminal may detect the present charging state, if the charging time is greater than or equal to the estimated charging time.

It should be noted that, in embodiments of the present disclosure, when the charging time is greater than or equal to the estimated charging time, the terminal may consider that the entire process of fast charging has been completed, or that a certain charging stage in the fast charging is completed. Consequently, the terminal needs to detect the present state of charging, that is, to detect the present charging state, to further determine whether a certain charging stage in the fast charging or the fast charging is completed during the estimated charging time.

In step 202, whether the abnormal charging occurs is determined according to the present charging state.

In embodiments of the present disclosure, after detecting the present charging state, the terminal may determine whether the abnormal charging occurs according to the present charging state.

It should be noted that, in embodiments of the present disclosure, after detecting and obtaining the present charging state, the terminal may further determine whether the present charging state corresponds to a charging state corresponding to the estimated charging time, thereby determining whether the abnormal charging occurs.

Further, in the implementation of the present disclosure, when the present charging state obtained by the terminal through detection does not correspond to the charging state corresponding to the estimated charging time, the terminal may determine that the abnormal charging occurs. As an example, the estimated charging time for the terminal to complete the fast charging is 60 min. When the charging time obtained through detection is longer than 60 min, the charging state obtained by the terminal through detection is fast charging in progress, that is, the terminal does not complete the fast charging in the estimated charging time, and thus it may be determined that the abnormal charging occurs.

According to the charging method provided by embodiments of the present disclosure, the terminal detects the battery power and the power consumption parameter before turning on the fast charging function; determines the estimated charging time according to the battery power and the power consumption parameter; determines whether the abnormal charging occurs according to the estimated charging time after turning on the fast charging function; and turns off the fast charging function when determining that an abnormal charging occurs. Therefore, in embodiments of the present disclosure, the terminal may estimate the estimated charging time required by the fast charging according to the battery power and the power consumption condition of the battery before the fast charging, and may determine whether the abnormal charging condition exists according to the estimated charging time and the actual charging time after turning on the fast charging function, so that the terminal may monitor the abnormal charging during the fast charging, and may terminate the fast charging in time once monitoring that there is the abnormal charging, thereby effectively improving the safety and intelligence of the terminal.

According to the above embodiment, in another embodiment of the present disclosure, when the terminal determines whether the abnormal charging occurs according to the present charging state, the following situations may be included.

Further, in embodiments of the present disclosure, when the estimated charging time is a fast charging completion time, the method for the terminal to judge whether the abnormal charging occurs according to the present charging state may include the following steps.

In step 202a, when the present charging state is an end state of the fast charging, it is determined that the abnormal charging does not occur.

In embodiments of the present disclosure, when the estimated charging time is the fast charging completion time, after the terminal detects that the present charging state is the end state of the fast charging, the terminal may determine that the abnormal charging does not occur.

It should be noted that, in embodiments of the present disclosure, when the estimated charging time is the fast charging completion time, it may be considered that the terminal needs to complete the fast charging according to the estimated charging time. Therefore, when the terminal obtains through detection that the present charging state is the end state of the fast charging, the terminal may consider that the fast charging process is normal and the abnormal charging does not occur.

In step 202b, when the present charging state is not the end state of fast charging, it is determined that the abnormal charging occurs.

In the embodiment of the present disclosure, when the estimated charging time is the fast charging completion time, after the terminal detects that the present charging state is not the end state of the fast charging, the terminal may determine that the abnormal charging occurs.

It should be noted that, in embodiments of the present disclosure, when the estimated charging time is the fast charging completion time, it may be considered that the terminal needs to complete the fast charging according to the estimated charging time. Therefore, when the terminal obtains through detection that the present charging state is not the end state of the fast charging, the terminal may consider that the abnormal charging occurs in the fast charging process.

Further, in an embodiment of the present disclosure, when the estimated charging time is a constant current completion time, the method for the terminal to judge whether the abnormal charging occurs according to the present charging state may include the following steps.

In step 202c, when the present charging state is a constant present charging state, it is determined that the abnormal charging occurs.

In embodiments of the present disclosure, when the estimated charging time is the constant current completion time, after the terminal detects that the present charging state is the constant current charging, the terminal may determine that the abnormal charging occurs.

It should be noted that, in an embodiment of the present disclosure, when the estimated charging time is the constant current completion time, it may be considered that the terminal needs to complete a constant current charging stage according to the estimated charging time. Therefore, when the terminal obtains through detection that the present charging state is the constant present charging state, the terminal may consider that the abnormal charging occurs in the fast charging process.

In step 202d, when the present charging state is not the constant present charging state, it is determined that the abnormal charging does not occur.

In an embodiment of the present disclosure, when the estimated charging time is the constant current completion time, after the terminal detects that the present charging state is not the constant present charging state, the terminal may determine that the abnormal charging does not occur.

It should be noted that, in embodiments of the present disclosure, when the estimated charging time is the constant current completion time, it may be considered that the terminal needs to complete the constant current charging stage according to the estimated charging time. Therefore, when the terminal obtains through detection that the present charging state is not the constant present charging state, the terminal may consider that the fast charging process is normal and the abnormal charging does not occur.

Further, in embodiments of the present disclosure, when the estimated charging time is a boosting completion time, the method for the terminal to determine whether the abnormal charging occurs according to the present charging state may include the following steps.

In step 202e, when the present charging state is a boosting state, it is determined that the abnormal charging occurs.

In embodiments of the present disclosure, when the estimated charging time is the boosting completion time, after the terminal detects that the present charging state is the boosting state, the terminal may determine that the abnormal charging occurs.

It should be noted that, in embodiment of the present disclosure, when the estimated charging time is the boosting completion time, it may be considered that the terminal needs to complete a boosting stage according to the estimated charging time. Therefore, when the terminal obtains through detection that the present charging state is the boosting state, the terminal may consider that the abnormal charging occurs in the fast charging process.

In step 202f, when the present charging state is not the boosting state, it is determined that the abnormal charging does not occur.

In embodiments of the present disclosure, when the estimated charging time is the boosting completion time, after the terminal detects that the present charging state is not the boosting state, the terminal may determine that the abnormal charging does not occur.

It should be noted that, in embodiments of the present disclosure, when the estimated charging time is the boosting completion time, it may be considered that the terminal needs to complete the boosting stage according to the estimated charging time. Therefore, when the terminal obtains through detection that the present charging state is not the boosting state, the terminal may consider that the fast charging process is normal and the abnormal charging does not occur.

Further, in embodiments of the present disclosure, the estimated charging time may further be configured to represent a time of the other charging stage corresponding to the fast charging of the terminal, which is not specifically limited in the present disclosure.

According to the charging method provided by embodiments of the present disclosure, the terminal detects the battery power and the power consumption parameter before turning on the fast charging function; determines the estimated charging time according to the battery power and the power consumption parameter; determines whether the abnormal charging occurs according to the estimated charging time after turning on the fast charging function; and turns off the fast charging function when determining that the abnormal charging occurs. Therefore, in embodiments of the present disclosure, the terminal may estimate the estimated charging time required by the fast charging according to the battery power and the power consumption condition of the battery before the fast charging, and may determine whether the abnormal charging condition exists according to the estimated charging time and the actual charging time after turning on the fast charging function, so that the terminal may monitor the abnormal charging during the fast charging, and may terminate the fast charging in time once monitoring that there is the abnormal charging, thereby effectively improving the safety and intelligence of the terminal.

According to the above embodiment, in another embodiment of the present disclosure, after the terminal determines whether the abnormal charging occurs according to the estimated charging time, the method for charging the terminal may further include the following steps.

In step 106, a power reduction instruction is sent when determining that the abnormal charging occurs.

In step 107, a power reduction response for responding to the power reduction instruction is received.

In embodiments of the present disclosure, when the terminal determines that the abnormal charging occurs after determining whether the abnormal charging occurs according to the estimated charging time, the terminal may send the power reduction instruction to the adapter.

Further, in embodiments of the present disclosure, after determining that the abnormal charging occurs, the terminal may choose to turn on the preset protection mode for performing safety protection on the charging of the terminal.

It should be noted that, in embodiments of the present disclosure, the preset protection mode may be configured to process the abnormal charging. In detail, the preset protection mode may refer to turning off the fast charging function and terminating the fast charging. The preset protection mode may further refer to reducing the input power of the fast charging and performing charging with a small input power.

Further, in an embodiment of the present disclosure, after sending the power reduction instruction to the adapter, the terminal may receive the power reduction response sent by the adapter for responding to the power reduction instruction.

It should be noted that, in embodiments of the present disclosure, after receiving the power reduction instruction, the adapter may change the charging voltage and the charging current, thereby reducing the charging power of the fast charging. Therefore, the power reduction response carries the changed charging current and charging voltage.

In step 108, the charging is performed according to the power reduction response.

In embodiments of the present disclosure, after receiving the power reduction response for responding to the power reduction instruction, the terminal may perform the charging according to the power reduction response.

Further, in embodiments of the present disclosure, after receiving the power reduction response, the terminal may perform the charging according to the changed charging current and charging voltage carried in the power reduction response, so that the charging power may be changed accordingly to reduce the charging power.

According to the charging method provided by embodiments of the present disclosure, the terminal detects the battery power and the power consumption parameter before turning on the fast charging function; determines the estimated charging time according to the battery power and the power consumption parameter; determines whether the abnormal charging occurs according to the estimated charging time after turning on the fast charging function; and turns off the fast charging function when determining that the abnormal charging occurs. Therefore, in embodiments of the present disclosure, the terminal may estimate the estimated charging time required by the fast charging according to the battery power and the power consumption condition of the battery before the fast charging, and may determine whether the abnormal charging condition exists according to the estimated charging time and the actual charging time after turning on the fast charging function, so that the terminal may monitor the abnormal charging during the fast charging, and may terminate the fast charging in time once monitoring that there exists the abnormal charging, thereby effectively improving the safety and intelligence of the terminal.

According to the abovementioned embodiments, in another embodiment of the present disclosure, as illustrated in FIG. 4, which is a schematic diagram of a terminal according to an embodiment of the present disclosure, a terminal 1 according to an embodiment of the present disclosure may include a detecting portion 11, a determining portion 12, a judging portion 13, a turn-off portion 14 and a recording portion 15.

The detecting portion 11 is configured to detect the battery power and the power consumption parameter before the fast charging function is turned on.

The determining portion 12 is configured to determine the estimated charging time according to the battery power and the power consumption parameter.

The judging portion 13 is configured to judge whether the abnormal charging occurs according to the estimated charging time after the fast charging function is turned on.

The turn-off portion 14 is configured to turn off the fast charging function when it is determined that the abnormal charging occurs.

Further, in an embodiment of the present disclosure, the recording portion 15 is configured to record the charging time when turning on the fast charging function, before it is determined whether the abnormal charging occurs according to the estimated charging time.

Further, in an embodiment of the present disclosure, the judging portion 13 is specifically configured to detect the present charging state if the charging time is greater than or equal to the estimated charging time, and to judge whether the abnormal charging occurs according to the present charging state.

Further, in an embodiment of the present disclosure, the judging portion 13 is specifically configured to, in a case where the estimated charging time is the fast charging completion time, determine that the abnormal charging does not occur if the present charging state is the end state of the fast charging; and determine that the abnormal charging occurs if the present charging state is not the end state of the fast charging.

Further, in an embodiment of the present disclosure, the judging portion 13 is specifically configured to, in a case where the estimated charging time is the constant current completion time, determine that the abnormal charging occurs if the present charging state is the constant present charging state, and determine that the abnormal charging does not occur if the present charging state is not the constant present charging state.

Further, in an embodiment of the present disclosure, the judgement portion 13 is specifically configured to, in a case where the estimated charging time is the boosting completion time, determine that the abnormal charging occurs if the present charging state is the boosting state, and determine that the abnormal charging does not occur if the present charging state is not the boosting state.

Figure 5:
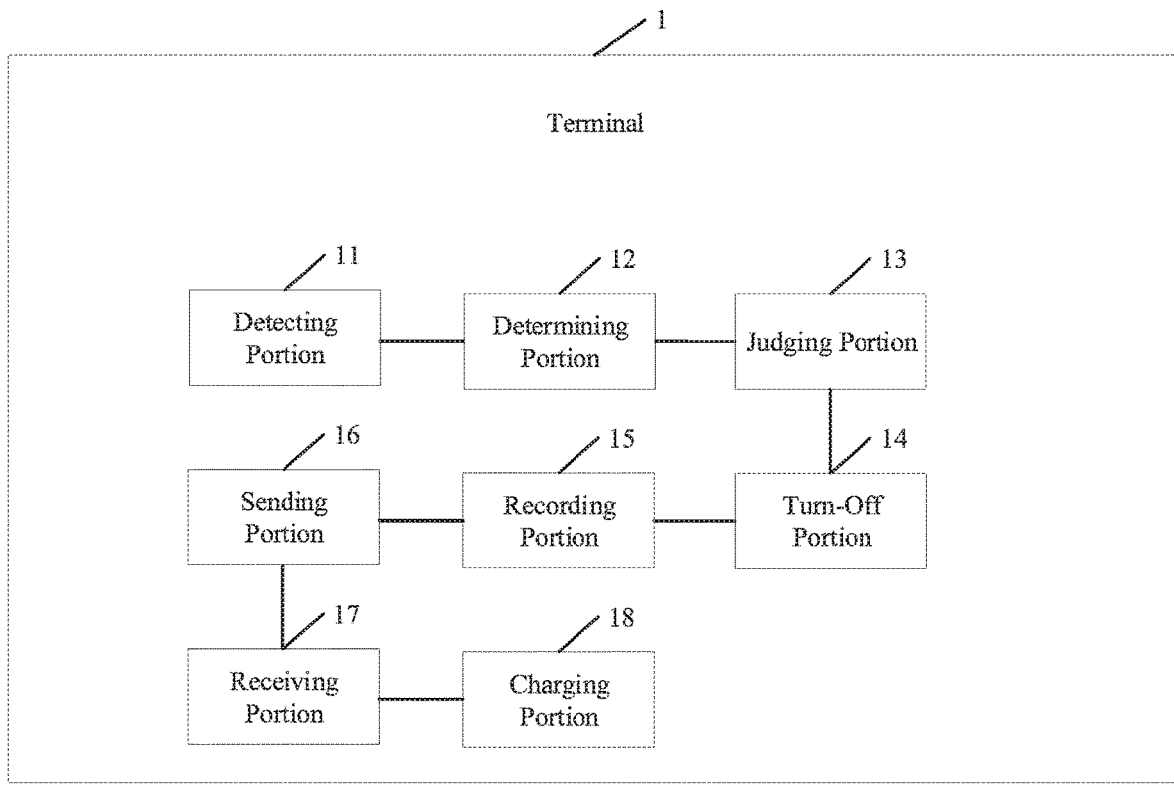
FIG. 5 is a schematic diagram of a terminal according to another embodiment of the present disclosure.

Further, in an embodiment of the present disclosure, as illustrated in FIG. 5, which is a schematic diagram of a terminal according to another embodiment of the present disclosure, the terminal 1 according to embodiments of the present disclosure may further include a sending portion 16, a receiving portion 17 and a charging portion 18.

The sending portion 16 is configured to send a power reduction instruction when determining that the abnormal charging occurs, after determining whether the abnormal charging occurs according to the estimated charging time.

The receiving portion 17 is configured to receive a power reduction response for responding to the power reduction instruction.

The charging portion 18 is configured to perform charging according to the power reduction response.

Further, in an embodiment of the present disclosure, the receiving portion 17 is further configured to receive a request instruction before detecting the battery power and the power consumption parameter, wherein the request instruction is configured for a request to establish the connection and to turn on the fast charging function.

Further, in an embodiment of the present disclosure, the detecting portion 11 is specifically configured to detect a present running state and a present running application; and to determine the power consumption parameter according to the present running state and the present running application.

Figure 6:
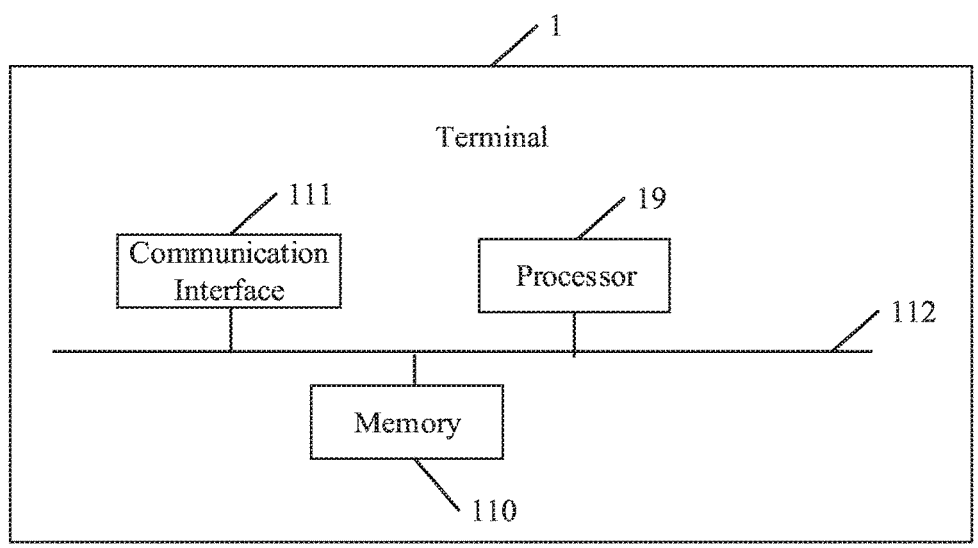
FIG. 6 is a schematic diagram of a terminal according to yet another embodiment of the present disclosure.

FIG. 6 is a schematic diagram of a terminal according to yet another embodiment of the present disclosure. As illustrated in FIG. 6, the terminal 1 according to embodiments of the present disclosure may include a processor 19, and a memory 110 storing instructions executable by the processor 19. Further, the terminal 1 may further include a communication interface 111, and a bus 112 for connecting the processor 19, the memory 110, and the communication interface 111.

In embodiments of the present disclosure, the processor 19 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller and a microprocessor. It is to be understood that, for different devices, an electronic element for implementing the above-mentioned functions of the processor may be of other types and is not specifically limited in embodiments of the present disclosure. The memory 110 is configured to store executable program codes, including computer operation instructions. The memory 110 may include a high-speed RAM memory, and may also include a non-volatile memory, such as at least two disk memories.

In embodiments of the present disclosure, the bus 112 is configured to connect the communication interface 111, the processor 19 and the memory 110, as well as for intercommunication between these elements.

In embodiments of the present disclosure, the memory 110 is configured to store instructions and data.

Further, in embodiments of the present disclosure, the processor 19 is configured to: detect the battery power and the power consumption parameter before turning on the fast charging function; determine the estimated charging time according to the battery power and the power consumption parameter; determine whether the abnormal charging occurs according to the estimated charging time after turning on the fast charging function; and turn off the fast charging function when determining that the abnormal charging occurs.

In practical applications, the memory may be a volatile memory, such as a random access memory (RAM); a non-volatile memory, such as a read-only memory (ROM), a flash memory, a hard disk drive (HDD) or a solid-state drive (SSD); or a combination of the above memories, and is configured to provide instructions and data to the processor.

In addition, individual functional modules in embodiments of the present disclosure may be integrated in one processing unit or may be separately physically present, or two or more modules may be integrated in one unit. The integrated unit as described above may be achieved. in the form of hardware, or may be achieved in the form of a software functional module.

If the integrated unit is achieved in the form of a software functional module and is not sold or used as a separate product, the integrated unit may also be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) or a processor to execute all or part of steps in the methods described in respective embodiments of the present disclosure. The above storage medium may be any medium capable of storing program codes, including a USB flash disk, a mobile hard disk, a read-only memory (ROM), a random access memory (RAM), a disc, or a light disk.

Embodiments of the present disclosure provide a terminal. The terminal detects the battery power and the power consumption parameter before turning on the fast charging function; determines the estimated charging time according to the battery power and the power consumption parameter; determines whether the abnormal charging occurs according to the estimated charging time after turning on the fast charging function; and turns off the fast charging function when determining that an abnormal charging occurs. Therefore, in embodiments of the present disclosure, the terminal may estimate the estimated charging time required by the fast charging according to the battery power and the power consumption condition of the battery before the fast charging, and may determine whether the abnormal charging condition exists according to the estimated charging time and the actual charging time after turning on the fast charging function, so that the terminal may monitor the abnormal charging during the fast charging, and may terminate the fast charging in time once monitoring that there exists the abnormal charging, thereby effectively improving the safety and intelligence of the terminal.

Embodiments of the present disclosure provide a computer readable storage medium having a program stored thereon. When the program is executed by a processor, the charging method as described above is implemented.

In detail, a program instruction corresponding to a charging method in embodiments may be stored on a storage medium such as an optical disk, a hard disk, a USB disk, or the like. When the program instruction corresponding to the charging method in the storage medium is read or executed by an electronic device, the following steps are included:

detecting the battery power and the power consumption parameter before the fast charging function is turned on;

determining the estimated charging time according to the battery power and the power consumption parameter;

determining whether the abnormal charging occurs according to the estimated charging time after the fast charging function is turned on; and turning off the fast charging function when determining that the abnormal charging occurs.

Those skilled in the art will appreciate that embodiments of the present disclosure may be provided as a method, a system, or a computer program product. Accordingly, the present disclosure may take the form of a hardware embodiment, a software embodiment, or an embodiment in combination with software and hardware. Moreover, the present disclosure may take the form of the computer program product that is embodied on one or more computer-usable storage media (including but not limited to disk memories and optical memories, etc.) including computer-usable program codes.

The present disclosure is described with reference to implementation flow charts and/or block diagrams of a method, a device (a system) and a computer program product according to embodiments of the present disclosure. It may be understood that each flow and/or block in a flow chart and/or a block diagram, and a combination of a flow and/or a block in a flow chart and/or a block diagram may be implemented by computer program instructions. The computer program instructions may be provided to a processor in a general purpose computer, a special purpose computer, an embedded processor, or other programmable data processing devices to produce a machine, so that instructions executed by a processor in a computer or other programmable data processing devices generate a means configured to implement functions specified in one or more flows in a flow chart and/or one or more blocks in a block diagram.

The computer program instructions may also be stored in a computer readable memory that may instruct a computer or other programmable data processing devices to operate in a particular manner, such that the instructions stored in the computer readable memory produce a manufactured product including an instruction device. The device implements functions specified in one or more flows in a flow chart and/or one or more blocks in a block diagram.

These computer program instructions may also be loaded onto a computer or other programmable data processing devices such that a series of operational steps are performed on a computer or other programmable devices to produce processing implemented by the computer. Consequently, instructions executed on the computer or other programmable devices provide steps for implementing the functions specified in one or more flows in a flow chart and/or one or more blocks in a block diagram.

The above embodiments are only preferred embodiments of the present disclosure and are not intended to limit the scope of the present disclosure.

INDUSTRIAL APPLICABILITY

Embodiments of the present disclosure provide a charging method, a terminal and a computer storage medium. The terminal detects a battery power and a power consumption parameter before turning on a fast charging function; determines an estimated charging time according to the battery power and the power consumption parameter; determines whether an abnormal charging occurs according to the estimated charging time after turning on the fast charging function; and turns off the fast charging function when determining that an abnormal charging occurs. Therefore, in embodiments of the present disclosure, the terminal may estimate the estimated charging time required by the fast charging according to the battery power and the power consumption condition of the battery before the fast charging, and may determine whether an abnormal charging condition exists according to the estimated charging time and the actual charging time after turning on the fast charging function, so that the terminal may monitor the abnormal charging during the fast charging, and may terminate the fast charging in time once monitoring that there exists the abnormal charging, thereby effectively improving the safety and intelligence of the terminal.

What is claimed is:

1. A method of charging, applied to a terminal, comprising:
   detecting a battery power and a power consumption parameter before turning on a fast charging function;
   determining an estimated charging time according to the battery power and the power consumption parameter, wherein the estimated charging time is a total charging time required for the terminal to complete the fast charging or a duration of a charging phase when the fast charging is performed on the terminal;
   determining whether an abnormal charging occurs according to the estimated charging time after turning on the fast charging function; and
   turning off the fast charging function when determining that the abnormal charging occurs,
   wherein determining whether the abnormal charging occurs according to the estimated charging time comprises:
   recording a charging time when turning on the fast charging functions;
   detecting a present charging state when the charging time is greater than or equal to the estimated charging time; and
   determining whether the abnormal charging occurs according to the present charging state.

2. The method according to claim 1, wherein the estimated charging time is a fast charging completion time, and determining whether the abnormal charging occurs according to the present charging state comprises:
   determining that the abnormal charging does not occur if the present charging state is a fast charging completion state; and
   determining that the abnormal charging occurs if the present charging state is not the fast charging completion state.

3. The method according to claim 1, wherein the estimated charging time is a constant current completion time, and determining whether the abnormal charging occurs according to the present charging state comprises:
   determining that the abnormal charging occurs if the present charging state is a constant current charging state; and
   determining that the abnormal charging does not occur if the present charging state is not the constant current charging state.

4. The method according to claim 1, wherein the estimated charging time is a boosting completion time, and determining whether the abnormal charging occurs according to the present charging state comprises:
   determining that the abnormal charging occurs if the present charging state is a boosting state; and
   determining that the abnormal charging does not occur if the present charging state is not the boosting state.

5. The method according to claim 1, further comprising:
   sending a power reduction instruction when determining that the abnormal charging occurs;
   receiving a power reduction response for responding to the power reduction instruction; and
   performing charging according to the power reduction response.

6. The method according to claim 1, further comprising:
   receiving a request instruction, wherein the request instruction is configured for a request to establish a connection with a charging device and to turn on the fast charging function.

7. The method according to claim 1, wherein detecting the power consumption parameter comprises:
   detecting a present running state and a present running application; and
   determining the power consumption parameter according to the present running state and the present running application.

8. A terminal, comprising:
   a processor; and
   a memory, configured to store instructions executable by the processor,
   wherein the processor is configured to implement a charging method by reading and executing the instructions stored in the memory, the charging method comprising:
   detecting a battery power and a power consumption parameter before turning on a fast charging function;
   determining an estimated charging time according to the battery power and the power consumption parameter, wherein the estimated charging time is a total charging time required for the terminal to complete the fast charging or a duration of a charging phase when the fast charging is performed on the terminal;

recording a charging time when turning on the fast charging function;

detecting a present charging state when the charging time is greater than or equal to the estimated charging time;

determining whether an abnormal charging occurs according to the present charging state; and turning off the fast charging function when determining that the abnormal charging occurs.

9. The terminal according to claim 8, wherein the estimated charging time is a fast charging completion time, and the processor is configured to:

determine that the abnormal charging does not occur if the present charging state is a fast charging completion state; and determine that the abnormal charging occurs if the present charging state is not the fast charging completion state.

10. The terminal according to claim 8, wherein the estimated charging time is a constant current completion time, and the processor is configured to:

determine that the abnormal charging occurs if the present charging state is a constant current charging state; and determine that the abnormal charging does not occur if the present charging state is not the constant current charging state.

11. The terminal according to claim 8, wherein the estimated charging time is a boosting completion time, and the processor is configured to:

determine that the abnormal charging occurs if the present charging state is a boosting state; and determine that the abnormal charging does not occur if the present charging state is not the boosting state.

12. The terminal according to claim 8, wherein the processor is further configured to:

send a power reduction instruction when determining that the abnormal charging occurs;

receive a power reduction response for responding to the power reduction instruction; and perform charging according to the power reduction response.

13. The terminal according to claim 8, wherein the processor is further configured to:

receive a request instruction before detecting the battery power and the power consumption parameter, wherein the request instruction is configured for a request to establish a connection with a charging device and to turn on the fast charging function.

14. The terminal according to claim 8, wherein the processor is configured to:

detect a present running state and a present running application; and determine the power consumption parameter according to the present running state and the present running application.

15. A non-transitory computer readable storage medium, having a program stored thereon and applied to a terminal, wherein when the program is executed by a processor, a charging method is implemented, the charging method comprising:

detecting a battery power and a power consumption parameter before turning on a fast charging function;

determining an estimated charging time according to the battery power and the power consumption parameter, wherein the estimated charging time is a total charging time required for the terminal to complete the fast charging or a duration of a charging phase when the fast charging is performed on the terminal;

determining whether an abnormal charging occurs according to the estimated charging time after turning on the fast charging function; and turning off the fast charging function when determining that the abnormal charging occurs, wherein determining whether the abnormal charging occurs according to the estimated charging time comprises:

recording a charging time when turning on the fast charging function;

detecting a present charging state when the charging time is greater than or equal to the estimated charging time; and determining whether the abnormal charging occurs according to the present charging state.

\* \* \* \* \*